United States Patent
Williams

(10) Patent No.: US 10,232,811 B2
(45) Date of Patent: Mar. 19, 2019

(54) ENERGY-ABSORBING CONNECTING STRUCTURE FOR BUMPER REINFORCEMENTS

(71) Applicant: Toyota Motor Engineering & Manufacturing North America, Inc., Erlanger, KY (US)

(72) Inventor: Paxton S. Williams, Milan, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 36 days.

(21) Appl. No.: 15/434,424

(22) Filed: Feb. 16, 2017

(65) Prior Publication Data

US 2018/0194311 A1  Jul. 12, 2018

Related U.S. Application Data

(60) Provisional application No. 62/445,002, filed on Jan. 11, 2017.

(51) Int. Cl.
   *B60R 19/34* (2006.01)
(52) U.S. Cl.
   CPC .................... *B60R 19/34* (2013.01)

(58) Field of Classification Search
   CPC .................................................. B60R 19/34
   See application file for complete search history.

(56) References Cited

U.S. PATENT DOCUMENTS 7,284,788 B1  10/2007  Barbat et al.
7,427,090 B2 *  9/2008  Hodoya ............... B60R 19/18
                                                                    293/102

* cited by examiner

*Primary Examiner* — D Glenn Dayoan
*Assistant Examiner* — Melissa A Black
(74) *Attorney, Agent, or Firm* — Christopher G. Darrow; Darrow Mustafa PC

(57) ABSTRACT

A connecting structure is structured to connect a vehicle bumper reinforcement to another portion of a vehicle. The connecting structure includes a first portion having a first part structured for connection to the bumper reinforcement and a second part structured for connection to the other portion of the vehicle. A second portion is coupled to the first portion, the second portion also having a first part structured for connection to the bumper reinforcement, and a second part structured for connection to the other portion of the vehicle. At least one fold is positioned along an edge of the second portion. Through connections between the connecting structure and the bumper reinforcement, collision energy acting on the bumper reinforcement is transmitted to the at least one fold, which then acts to absorb the collision energy acting on the bumper reinforcement.

19 Claims, 6 Drawing Sheets

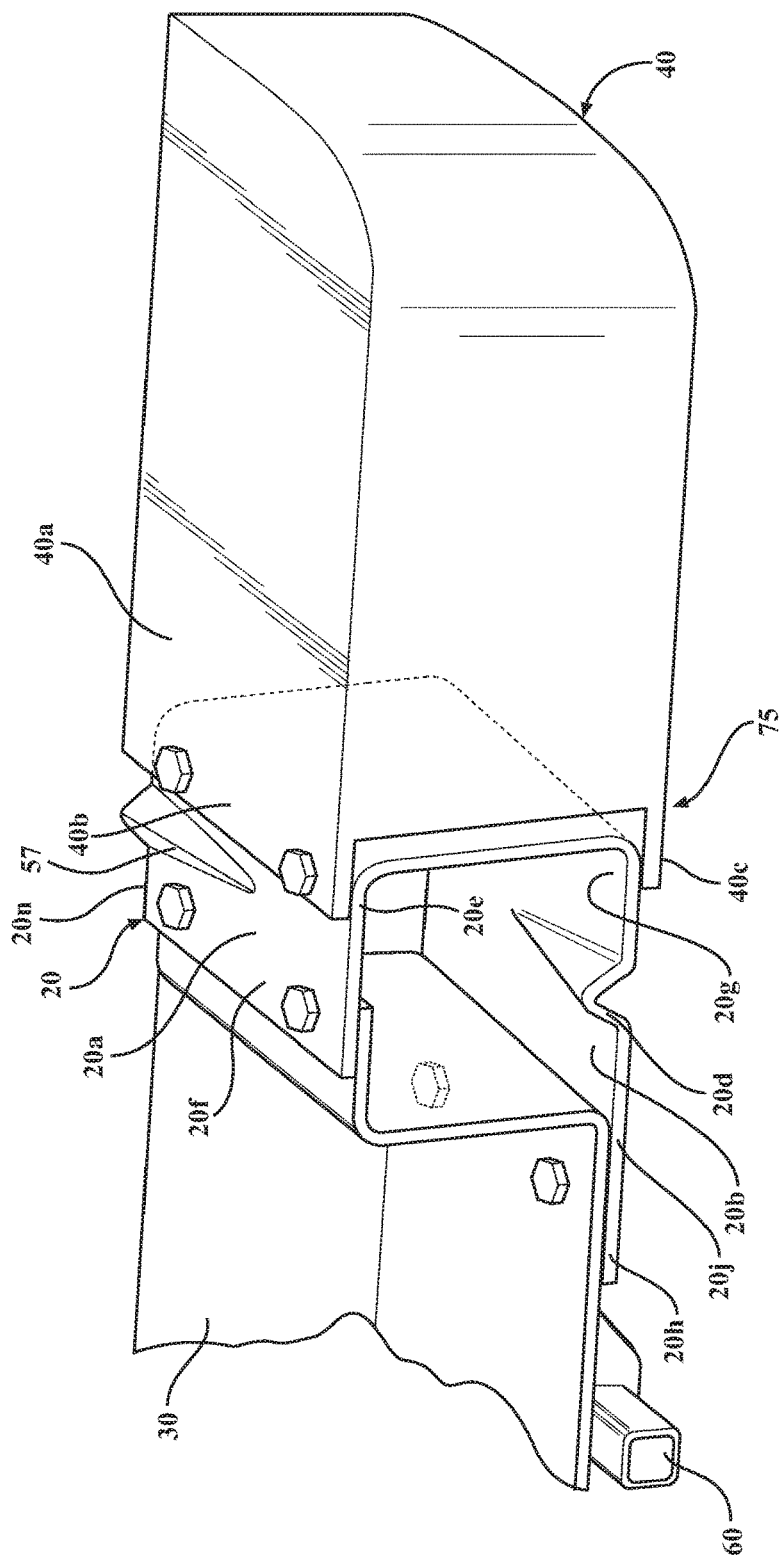

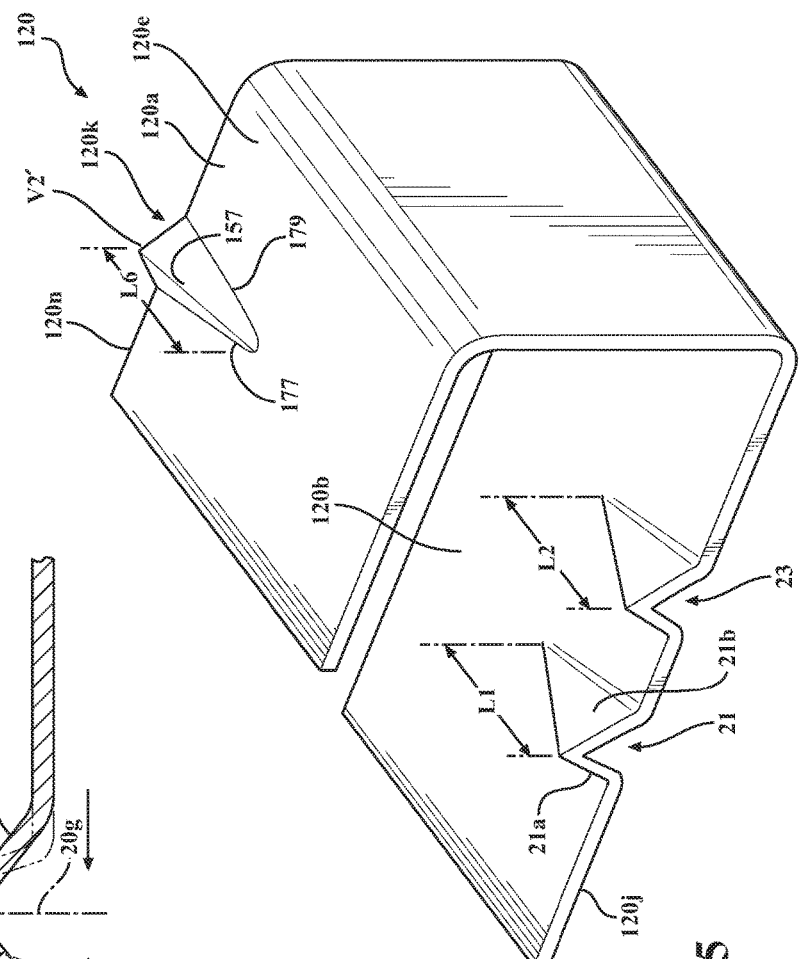

ENERGY-ABSORBING CONNECTING STRUCTURE FOR BUMPER REINFORCEMENTS

CROSS REFERENCE TO RELATED APPLICATIONS

This application claims benefit of U.S. Provisional Application No. 62/445,002 filed on Jan. 11, 2017, which is herein incorporated by reference in its entirety.

TECHNICAL FIELD

The present invention relates to vehicle bumpers and, more particularly, for methods of indicating damage to vehicle bumpers.

BACKGROUND

Bumpers and bumper reinforcements on modern vehicle may be formed from polymer materials, such as glass-filled polymers. Such materials may crack under impact loading, due to collision forces operating on the bumper, for example. Propagation of a bumper reinforcement crack may cause a portion of the bumper reinforcement to separate from the remainder of the bumper reinforcement. If the bumper reinforcement is enclosed within a shell or cover, the user may not be able to visually detect the damaged condition of the bumper reinforcement.

SUMMARY

In one aspect of the embodiments described herein, a connecting structure structured to connect a vehicle bumper reinforcement to another portion of a vehicle is provided. The connecting structure includes a first portion having a first part structured for connection to the bumper reinforcement and a second part structured for connection to the other portion of the vehicle. A second portion is coupled to the first portion, the second portion having a first part structured for connection to the bumper reinforcement, and a second part structured for connection to the other portion of the vehicle. At least one fold is positioned along an edge of the second portion. The at least one fold has a longitudinal dimension extending from the edge in a direction away from the edge.

In another aspect of the embodiments described herein, a vehicle bumper assembly structured for connection to a portion of a vehicle is provided. The bumper assembly includes a vehicle bumper reinforcement and a connecting structure including a first portion connected to the bumper reinforcement and structured for connection to the portion of the vehicle. The connecting structure also includes a second portion coupled to the first portion. The second portion is connected to the bumper reinforcement and is also structured for connection to the portion of the vehicle. At least one fold is positioned along a rear edge of the second portion between a connection to the bumper reinforcement and a portion of the second portion structured for connection to the portion of the vehicle. The at least one fold is structured and positioned so as to at least partially unfold responsive to application of an collision force to the bumper reinforcement.

In another aspect of the embodiments described herein, a method of providing a visual indication of vehicle bumper damage is provided. The method includes steps of: providing a connecting structure structured to connect a vehicle bumper reinforcement to another portion of a vehicle, the connecting structure including a deformation portion structured to deform responsive to operation of a collision force on the bumper reinforcement; and covering the connecting structure and the bumper reinforcement with a cover structured to be visible to a user when the cover, connecting structure, and bumper reinforcement are installed in a normal use position on a vehicle, the cover having a portion positioned adjacent the deformation portion and structured to deform responsive to deformation of the deformation portion so as to provide a visual indication of operation of the collision force on the bumper reinforcement.

BRIEF DESCRIPTION OF THE DRAWINGS

FIG. 2A is a schematic perspective view of a bumper reinforcement and a trailer hitch mounting bracket attached to an embodiment of the connecting structure, prior to operation of a collision force on the bumper reinforcement.

FIG. 4 is a schematic edge view of a portion of the connecting structure shown in FIG. 3B, illustrating deformation of a deformation portion of the connecting structure responsive to a collision force.

FIG. 5 is a schematic perspective view of a connecting structure for connecting a vehicle bumper reinforcement to a vehicle, in accordance with another embodiment described herein.

DETAILED DESCRIPTION

Figure 1:
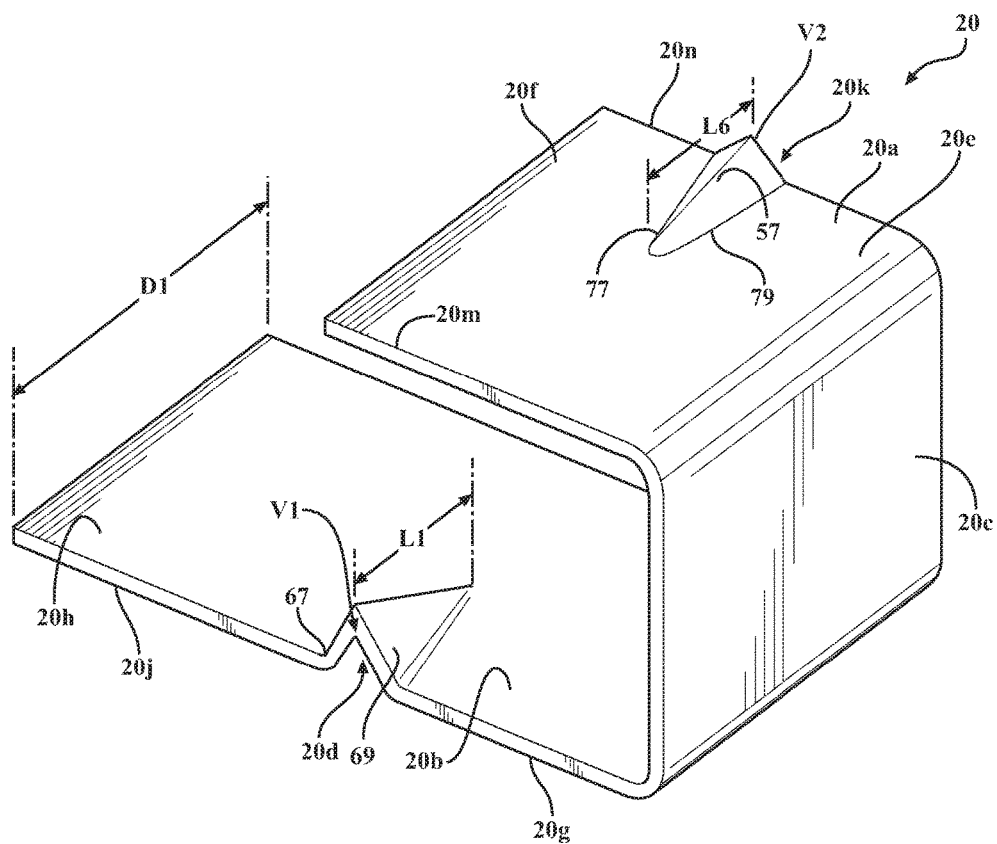
FIG. 1 is a schematic perspective view of a connecting structure for connecting a vehicle bumper reinforcement to a vehicle, in accordance with an embodiment described herein.

The embodiments described herein relate to a connecting structure structured to connect a vehicle bumper reinforcement to another portion of a vehicle is provided. The connecting structure includes at least one folded portion structured to stretch or unfold responsive to operation of a collision force on the bumper reinforcement. Stretching or unfolding of the folded portion absorbs collision energy while maintaining attachment of the bumper reinforcement to the vehicle (for example, in the event of a user stepping on the bumper). In addition, another folded portion may be provided. The other folded portion may be structured to deform responsive to collision forces so as to press against a cover enclosing the connecting structure and the bumper reinforcement. Pressing of the other folded portion against the cover may create a raised area on the cover which serves as a visual indication of operation of collision forces on the bumper, and may indicate to a user the need for servicing to repair the bumper. Alternatively, pressing of the other folded portion against the cover may cause the cover to be penetrated or cracked. This penetration or crack may also form a visual indication of operation of collision forces on the bumper.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIGS. 1-5 show various embodiments 20 and 120 of a connecting structure designed to connect a vehicle bumper reinforcement 40 to another portion of a vehicle. In the embodiments shown, the connecting structure 20 may include a first portion 20a having a first part or surface 20e structured for connection to the bumper reinforcement 40, and a second part or surface 20f structured for connection to the other portion of the vehicle.

The connecting structure 20 also may include a second portion 20b coupled to the first portion 20a. In the embodiment shown, the second portion 20b is coupled to the first portion 20a by a third portion 20c. The third portion 20c may serve as a base, with first and second portions 20a and 20b extending from opposite edges thereof. However, the first and second portions 20a and 20b may be coupled to each other using any suitable alternative structure. As seen in the drawings, the second portion 20b may have a first part or surface 20g structured for connection to the bumper reinforcement 40, and a second part or surface 20h structured for connection to the other portion of the vehicle. In one or more arrangements, the connecting structure first portion 20a is also structured to reside above the connecting structure second portion 20b when the connecting structure 20 is mounted to a vehicle in its normal use configuration on the vehicle, as shown in FIG. 2A.

Bumper reinforcement 40 may have a body portion 40a with flanges 40b and 40c extending from the body portion 40a and structured to enable attachment of the bumper reinforcement 40 to the connecting structure 20. Bumper reinforcement flanges 40b and 40c may be attached to connecting structure first portion first part 20e and second portion first part 20g, respectively, using any suitable method, for example mechanical fasteners. Bumper reinforcement 40 may be formed from any suitable material, for example, a metallic material or a polymeric material (such as a glass-filled polymer). The connecting structure 20 may be formed from any material suitable for the purposes described herein. For example, a steel having a suitable gauge and composition may be used.

Figure 2B:
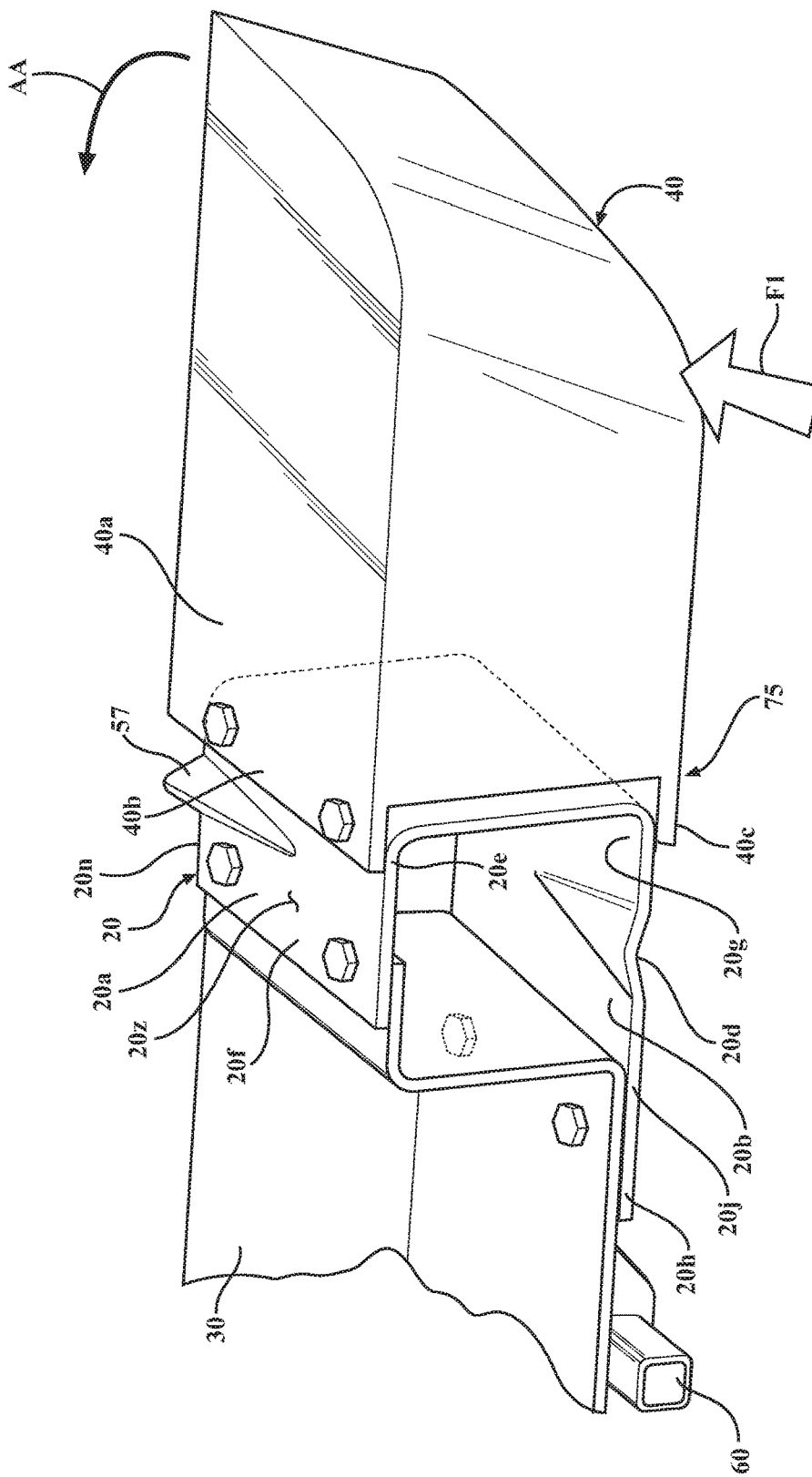
FIG. 2B is the schematic perspective view of FIG. 2A showing movement of the bumper reinforcement and deformation of the folds of the connecting structure after and responsive to operation of a collision force on the bumper reinforcement.

In one or more arrangements, the other portion of the vehicle may be a mounting bracket 30 for a trailer hitch as shown in FIGS. 2A and 2B. However, a side of the connecting structure 20 may be attached to other portions of the vehicle, depending on such factors as the particular vehicle design and operational requirements. The trailer hitch mounting bracket 30 may be attached to a rear portion of the vehicle frame in a known manner. The bracket 30 enables attachment of the trailer hitch 60 to the vehicle. The bracket 30 may be formed from steel or any other suitable material. The trailer hitch mounting bracket 30 may be attached to the connecting structure first portion second part 20f and second portion second part 20h, respectively, using any suitable method. As seen in FIGS. 2A and 2B, connecting structure 20 may be attached to the trailer hitch mounting bracket 30 using any suitable method, for example, mechanical fasteners or welding.

The attachment methods used to secure the connecting structure 20 to the trailer hitch mounting bracket 30 and to the bumper reinforcement 40 may be selected so as to help ensure that these connections are maintained even after a collision force F1 is applied to the bumper reinforcement 40/bumper 99. This helps ensure that the effects of the resulting stresses will be focused on the deformation portion(s) 20k and the fold 20d (both described in greater detail below), rather than on other portions of the connecting structure. In one or more arrangements, the trailer hitch mounting bracket 30 and the bumper reinforcement 40 may be bolted to the connecting structure 20 as shown in the drawings. Other attachment methods (such as welding or adhesive application) may also be used.

In addition, the connecting structure second portion 20b may have one or more folds 20d positioned along an edge 20j of the second portion 20b. Although a single fold is shown in FIG. 1, the second portion 20b may have multiple folds (for example, as shown in FIG. 5) positioned along the edge 20j, depending on such factors as size limitations and the operation requirements of a particular application. The fold 20d may have a longitudinal dimension L1 extending from the edge 20j in a direction away from the edge.

In the embodiment shown, the fold 20d is positioned along a rear edge 20j of the connecting structure second portion 20b. Although the fold 20d is shown positioned along a rear edge 20j of the connecting structure second portion 20b in FIGS. 1 and 2, the fold 20d may alternatively be positioned along a rear edge 20m of the first portion 20a. A "rear edge" of the first portion 20a or second portion 20b of the connecting structure 20 is an edge (such as edge 20j or 20m of FIGS. 1 and 2A-2B) that is or would be facing in a direction behind a vehicle when the connecting structure 20 is mounted to the vehicle in its normal use configuration on the vehicle. Similarly, a "front edge" of the first portion 20a or second portion 20b of the connecting structure 20 is an edge (such as edge 20n of FIG. 1) that is or would be facing in a direction ahead of the vehicle when the connecting structure 20 is mounted to the vehicle in its normal use configuration on the vehicle.

In one or more arrangements, the fold 20d (or folds, if multiple folds are used) may be positioned along the edge 20j of the second portion between the first part 20g and the second part 20h of the second portion 20b, spaced apart from the connections between the second portion 20b and the bumper reinforcement 40 and spaced apart from the connections between the second portion 20b and the mounting bracket 30. In addition, the deformation portion 20k (described in greater detail below) may be positioned along the edge 20n of the connecting structure first portion between the first part 20e and the second part 20f of the first portion 20a, spaced apart from the connections between the first portion 20a and the bumper reinforcement 40 and spaced apart from the connections between the first portion 20a and the mounting bracket 30. These positionings of the fold 20d and deformation portion 20k permit the fold 20d and deformation portion 20k to deform as described herein responsive to a collision force F1, without interference from the connections between the connecting structure 20 and the bumper reinforcement 40, and between the connecting structure 20 and the trailer hitch mounting bracket 30.

In one or more arrangements, the fold 20*d* is structured to extend upwardly, above the parts of the second portion 20*b* surrounding the fold 20*d* and from which the fold projects, when the connecting structure 20 is mounted to a vehicle in its normal use configuration on the vehicle. In particular embodiments, as shown in FIGS. 1 and 2A-2B, the fold 20*d* has a generally V-shaped cross-section. If desired, radii may be formed at the vertex of the "V" and along the junctions 67 and 69 where the sides of the fold 20*d* intersect the parts of the second portion 20*b* from which they extend. In particular embodiments, the fold 20*d* may extend from the second portion rear edge 20*j* in a direction away from the edge to a distance L1 of at least one half of a depth dimension D1 of the connecting structure second portion as shown in FIG. 1.

Although the fold 20*d* formed in connecting structure second portion 20*b* of FIGS. 1 and 2A-2B has a V-shaped cross-section, any fold (or folds) incorporated into the second portion 20*b* may have any other suitable shape (or shapes) which facilitate stretching of the folded part of the second portion 20*b* responsive to application of the collision force as described herein, and preferably without tearing or cracking the material of the second portion. As used herein, the term "collision" refers to a contact between two or more objects in which the two or more bodies exert forces on each other for a relatively short time. A "collision force" and "collision forces" refer to the forces generated by the collision and acting on the two or more bodies.

Figure 3A:
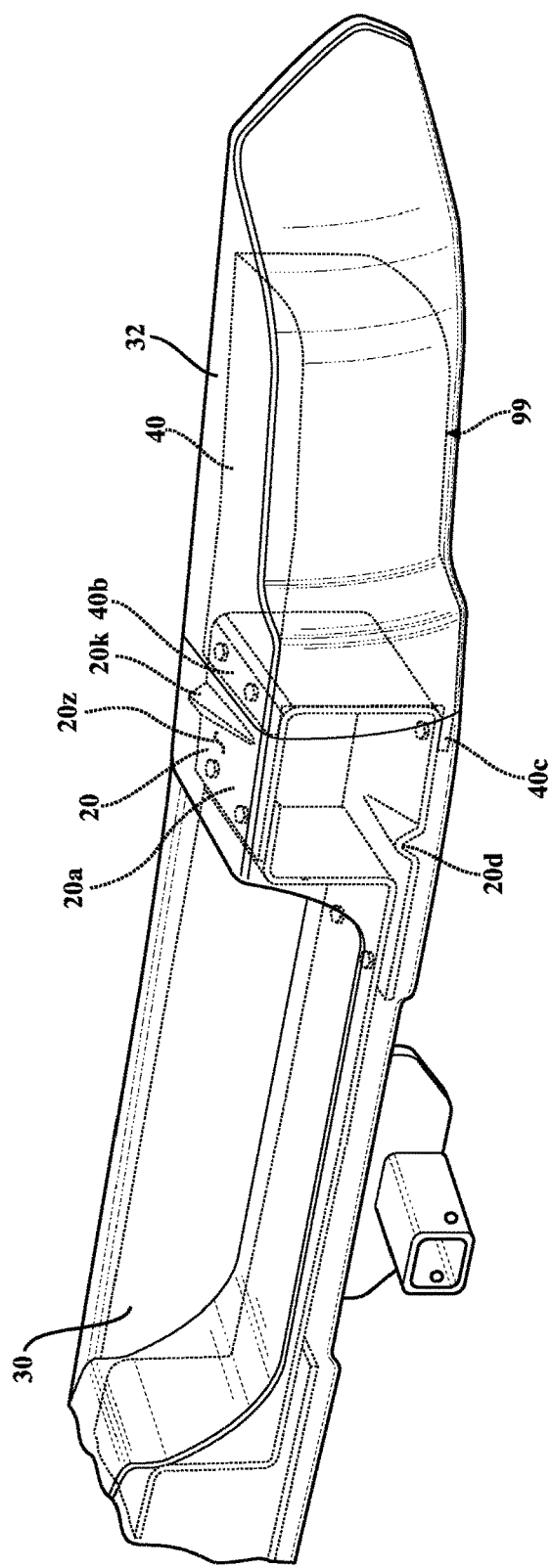
FIG. 3A is a schematic perspective view of the bumper reinforcement and trailer hitch mounting bracket 30 attached to the connecting structure embodiment of FIG. 2A, shown enclosed within a cover to form a vehicle bumper, and prior to operation of a collision force on the bumper.
Figure 3B:
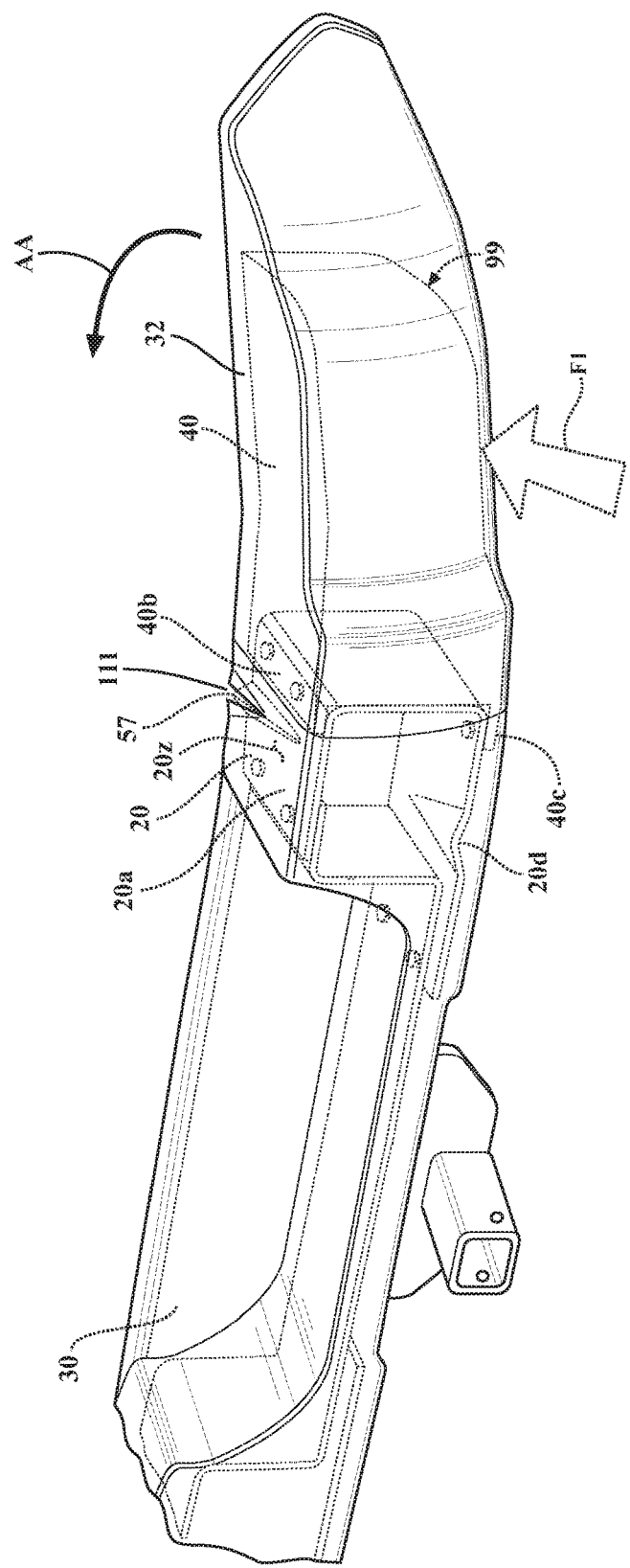
FIG. 3B is the schematic perspective view of FIG. 3A showing movement of the bumper reinforcement and deformation of the folds and of the connecting structure after and responsive to operation of the collision force on the bumper reinforcement.

The fold 20*d* may be structured to provide extra material to enable expansion or stretching of the portion of the connecting structure 20 incorporating the fold (for example, either first portion 20*a* or second portion 20*b*), responsive to a collision force F1 acting on the bumper reinforcement 40/bumper 99 as shown in FIGS. 2B and 3B. The collision force F1 acts to rotate the impacted portion of the bumper reinforcement 40/bumper 99 in the direction AA (generally in a forward direction of the vehicle while pivoting about the connecting structure 20/trailer hitch mounting bracket 30 junctions) with respect to the remainder of the bumper reinforcement 40/bumper 99. The fold 20*d* may be structured to straighten or "unfold" as shown in FIGS. 2B and 3B during application of the collision force to the bumper reinforcement 40, thereby absorbing the collision energy and maintaining the connection between the bumper reinforcement 40 and the remainder of the vehicle.

The connecting structure may be designed to maintain the connection between the bumper reinforcement 40 and the remainder of the vehicle so that a user stepping on the bumper, for example, would still be supported by the bumper reinforcement 40/bumper 99. However, the deformed post-collision connecting user may deflect responsive to the weight of the user, so that the user can discern that the bumper/bumper reinforcement is not properly connected to the remainder of the vehicle. This may indicate to the user that the bumper must be serviced.

FIG. 5 is a schematic perspective view of a connecting structure in accordance with another embodiment 120 described herein. Referring to FIG. 5, in particular embodiments, multiple folds (such folds 21 and 23) may be positioned along the edge 20*j* of the second portion 20*b*, with the folds having associated longitudinal dimensions L1 and L2 extending in a direction away from the edge. Connecting structure 120 of FIG. 5 may include the same features as connecting structure 20 of FIG. 1, except that the connecting structure 120 may have multiple folds 21 and 23 formed along second portion rear edge 120*j*. The amount of material available for expansion of the second portion 120*b* along rear edge 120*j* may be controlled by controlling the number and/or lengths of the wall portions (such as 21*a* and 21*b* of fold 21 in FIG. 5) of any of the folds formed in the second portion 120*b*.

Referring to FIGS. 1-4, the connecting structure 20 may also include at least one deformation portion, generally designated 20*k*, positioned along a front edge 20*n* of the first portion 20*a*. The deformation portion 20*k* may be a portion of the connecting structure 20 which is structured to deform simultaneously with the fold 20*d*, responsive to application of a collision force F1 to a bumper reinforcement 40 coupled to the first part 20*e* of the connecting structure first portion 20*a* and to the first part 20*g* of the connecting structure second portion 20*b*. The deformation portion 20*k* is designed to act as a stress-focusing feature, to localize or channel the stresses acting on the portion of the connecting structure 20 along which it formed. Thus, the deformation portion 20*k* may be positioned along a portion of the connecting structure so that forces acting on this portion of the connecting structure 20 deflect or otherwise affect the deformation portion 20*k* before affecting other parts of the first portion 20*a*, and/or so that most of the energy expended in deforming the first portion 20*a* is expended in deforming the deformation portion 20*k*.

In the location shown, edge 20*n* and the deformation portion 20*k* may be subject to compressive stresses resulting from a collision force F1 acting on the bumper reinforcement 40/bumper 99. The stresses may act on the deformation portion 20*k* to crack, deflect, or otherwise deform this edge of the connecting structure first portion 20*a*. The deformation portion 20*k* may be located along an edge of either of the connecting structure first portion 20*a* or along an edge of second portion 20*b* which does not have the fold 20*d* formed therealong. While the fold 20*d* may be structured and positioned so as to unfold or expand responsive to localized tension forces acting on the connecting structure second portion 20*b* along edge 20*j*, the deformation portion 20*k* may be structured and positioned so as to further fold, rupture, or otherwise deform responsive to localized compressive forces acting on the connecting structure first portion 20*a*, along front edge 20*n*.

Referring to FIGS. 1-4, in one or more arrangements, the deformation portion 20*k* may be in the form of a fold 57 located on connecting structure first portion 20*a*. The fold 57 may be positioned along the front edge 20*n* of the first portion 20*a*, and may have a longitudinal dimension L6 extending from the front edge 20*n* in a direction away from the front edge. The fold 57 may be similar to fold 20*d* previously described, or the fold may have any of a variety of other shapes.

In one or more arrangements, the fold 57 may structured to extend upwardly, above a part of the connecting structure first portion 20*a* surrounding the fold and from which the fold 57 projects, when the connecting structure 20 is mounted to a vehicle in its normal use configuration on the vehicle. This fold configuration is structured to bias a buckling direction of the connecting structure first portion 20*a* responsive to compressive forces acting along the first portion front edge 20*n*. Responsive to the compressive forces, the first portion front edge 20*n* may buckle such that the fold vertex V2 moves upwardly.

The fold 57 may have a V-shaped cross section, as shown in FIG. 1. Radii may be formed at the vertex of the "V" and along the junctions 77 and 79 where the sides of the fold 57 intersect the parts of the first portion 20*a* from which they extend. Although the fold 57 formed in connecting structure first portion 20*a* of FIG. 1 has a V-shaped cross-section, any fold (or folds) incorporated into the first portion 20*a* may have any other suitable shape (or shapes) which facilitate deformation of the part of the first portion incorporating the fold, in the manner described herein. In addition, although the deformation portion 20*k* is shown as a fold in the embodiments described herein, the deformation portion 20*k* may have any of a variety of alternative configurations, depending on the requirements of a particular application.

Depending on the magnitude of the collision force F1 and the location on the bumper at which the collision force is applied, the collision force may crack or otherwise damage the bumper reinforcement to a point where it is advisable to take the vehicle in for servicing to have the bumper repaired. FIG. 2A is a schematic perspective view of a bumper reinforcement 40 and a trailer hitch mounting bracket 30 attached to an embodiment 20 of the connecting structure, prior to operation of a collision force F1 on the bumper reinforcement. FIG. 2B is the schematic perspective view of FIG. 2A showing movement of the bumper reinforcement 40 and deformation of the folds 20*d* and 57 of the connecting structure 20 after and responsive to operation of the collision force F1 on the bumper reinforcement. FIG. 3A is a schematic perspective view of the bumper reinforcement 40 and trailer hitch mounting bracket 30 attached to the connecting structure embodiment 20 of FIG. 2A, shown enclosed within a cover 32 to form a vehicle bumper 99. FIG. 3A shows the bumper 99 prior to operation of a collision force F1 on the bumper. FIG. 3B is the schematic perspective view of FIG. 3A showing movement of the bumper reinforcement 40 and deformation of the folds 20*d* and 57 of the connecting structure 20 after and responsive to operation of the collision force F1 on the bumper reinforcement.

Operation of the connecting structure 20 responsive to a collision force F1 applied to the bumper reinforcement 40/bumper 99 is illustrated in FIGS. 2B and 3B. As seen in FIGS. 2B and 3B, the collision force F1 produces a rotational moment about the connections between the bumper reinforcement 40 and the connecting structure 20. Elements (for example, second portion rear edge 20*j*) of the connecting structure 20 residing toward a rear of the structure will experience tension forces, while elements (such as first portion front edge 20*n*) of the connecting structure residing at a front of the structure 20 will be subjected to compressive forces.

The fold 20*d* may be structured to straighten or "unfold" as the rear edge 20*j* stretches during application of localized tension forces, thereby absorbing the collision energy and permitting a degree of deflection of the bumper reinforcement 40 attached to the connecting structure 20, without fracturing or cracking the bumper reinforcement 40. This enables the connecting structure 20 to continue to secure or attach the bumper reinforcement 40 to the remainder of the vehicle even after collision. The connecting structure 20 supports the bumper reinforcement 40 even if, for example, a user steps on the bumper reinforcement 40. The user may be able to tell that the connections between the bumper reinforcement 40 and the remainder of the vehicle are weakened after a collision if the user steps on the bumper, if the bumper resides at an abnormal angle with respect to the vehicle, or if the user sees a raised area formed on the cover 32.

While the fold 20*d* may be structured and positioned so as to unfold or expand responsive to localized tension forces acting on the connecting structure second portion 20*b* along edge 20*j*, the deformation portion 20*k* may be structured and positioned so as to further fold or crumple deform responsive to localized compressive forces acting on the connecting structure first portion, along edge 20*n*. In the embodiment shown in FIGS. 2B and 3B, the deformation portion 20*k* is in the form of a fold 57 as previously described. Fold 57 may be structured to deform upwardly, to press against a cover 32. Pressure of the fold 57 against the cover 32 creates the raised area 32*r* indication damage to the bumper.

Referring to FIG. 4, in particular embodiments, the connecting structure first portion fold 57 may be structured to extend a first distance DD2 above the surrounding portions of the first portion 20*a* along which the fold 57 is positioned and from which the fold 57 extends, prior to application of a collision force F1 to the bumper reinforcement 40/bumper 99. The fold 57 may also be structured to extend a second distance DD3 above the surrounding parts of the first portion along which the fold 57 is positioned, after application of the collision force F1 to the bumper reinforcement 40/bumper 99 and the resulting deflection of the connecting structure 20. The post-collision configuration of the fold 57 is shown in phantom in FIG. 4. The distance DD3 may be greater than the distance DD2. Thus, the collision force F1 buckles or deforms the material of the first portion 20*a* so that the fold 57 further deforms in a direction away from connecting structure second portion 20*b*. In general, the deformation portion 20*k* may be structured to deform responsive to the compressive forces acting on edge 20*n*, so as to produce a visible indication of bumper damage.

Referring to FIGS. 3A, 3B, and 4, in particular embodiments, a cover 32 may be provided to extend over an upper surface 20*z* of the connecting structure first portion 20*a*. The cover 32 may be designed to deform easily responsive to a force exerted by the fold 57 as the connecting structure deforms during bumper collision. The cover 32 may be formed from a thin plastic material, for example. In one or more arrangements, the cover 32 may be a portion of a polymeric bumper shell structured to cover the bumper reinforcement 40 and the connecting structure 20, thereby forming a vehicle bumper 99.

In addition, the fold 57 may be structured to exert a force on the cover 32 responsive to application of a collision force F1 to the bumper reinforcement 40/bumper 99, so as to form a raised area 32*r* along the cover 32. The appearance of this raised area 32*r* may provide a visual indication that the bumper reinforcement/connecting structure connections have been damaged enough to cause severe buckling of the portion of the connecting structure containing the fold 57. This may indicate to a user that the vehicle should be taken to a dealer and the bumper repaired.

In particular embodiments, the fold 57 and the cover 32 may be positioned and structured so that the collision force causes the fold 57 to deform upwardly so as to create a rupture or penetration 111 of the cover 32, as shown in FIG. 5. This fracturing or penetration of the cover 32 by the fold 57 may provide a visual indication that the bumper reinforcement/connecting structure connections have been damaged enough to cause severe buckling of the portion of the connecting structure containing the fold 57. This may indicate to a user that the vehicle should be taken to a dealer and the bumper repaired.

In another aspect, a connecting structure 20 as described herein may be attached to a bumper reinforcement 40 to form a vehicle bumper assembly 75 structured for connection to a portion of a vehicle (for example, a trailer hitch mounting bracket) as previously described. The connecting structure 20 may have a first portion 20*a* connected to the bumper reinforcement 40 and to the portion of the vehicle, and a second portion 20*b* coupled to the connecting structure first portion 20*a*. The connecting structure second portion 20b may also be connected to the bumper reinforcement 40 and to the portion of the vehicle. At least one fold (such as fold 20d as shown in FIG. 1) being may be positioned along a rear edge 20j of the connecting structure second portion 20b between a connection of the connecting structure 20 to the bumper reinforcement 40 and a connection of the connecting structure to the portion of the vehicle. The at least one fold may be structured and positioned so as to at least partially unfold responsive to application of a collision force to the bumper reinforcement.

Also described herein is a method of providing a visual indication of vehicle bumper damage. The method includes steps of: the method includes steps of: providing a connecting structure structured to connect a vehicle bumper reinforcement to another portion of a vehicle, the connecting structure including a deformation portion structured to deform responsive to operation of a collision force on the bumper reinforcement, and covering the connecting structure and the bumper reinforcement with a cover structured to be visible to a user when the cover, connecting structure, and bumper reinforcement are installed in a normal use position on a vehicle, the cover having a portion positioned adjacent the deformation portion and structured to deform responsive to deformation of the deformation portion so as to provide a visual indication of operation of the collision force on the bumper reinforcement.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A connecting structure structured to connect a vehicle bumper reinforcement to another portion of a vehicle, the connecting structure comprising:
   a first portion having a first part structured for connection to the bumper reinforcement and a second part structured for connection to the other portion of the vehicle;
   a second portion coupled to the first portion, the second portion having a first part structured for connection to the bumper reinforcement, and a second part structured for connection to the other portion of the vehicle; and
   at least one fold positioned along an edge of the second portion, the at least one fold having a longitudinal dimension extending from the edge in a direction away from the edge.

2. The connecting structure of claim 1 wherein the connecting structure first portion is structured to reside above the connecting structure second portion when the connecting structure is mounted to a vehicle in its normal use configuration on the vehicle.

3. The connecting structure of claim 1 wherein the at least one fold is structured to extend upwardly when the connecting structure is mounted to a vehicle in its normal use configuration on the vehicle.

4. The connecting structure of claim 1 wherein the at least one fold has a V-shaped cross-section.

5. The connecting structure of claim 1 wherein the at least one fold is positioned along a rear edge of the connecting structure second portion.

6. The connecting structure of claim 5 wherein the connecting structure second portion has a depth dimension extending in the direction away from the rear edge toward a front edge of the second portion,
   and wherein the at least one fold extends from the rear edge in the direction away from the edge to a distance of at least one half the depth dimension.

7. The connecting structure of claim 1 wherein the at least one fold is positioned along the edge of the second portion between the first part and the second part of the second portion.

8. The connecting structure of claim 1 comprising a plurality of folds positioned along the edge of the second portion, each fold of the plurality of folds having a longitudinal dimension extending in a direction away from the edge.

9. A bumper assembly including a connecting structure in accordance with claim 1 and a bumper reinforcement connected to the connecting structure.

10. The connecting structure of claim 1 further comprising at least one deformation portion positioned along a front edge of the first portion.

11. The connecting structure of claim 10 wherein the at least one deformation portion comprises at least one fold positioned along the front edge of the first portion, the at least one deformation portion fold having a longitudinal dimension extending from the front edge in a direction away from the front edge.

12. The connecting structure of claim 11 wherein the at least one deformation portion fold is structured to extend upwardly when the connecting structure is mounted to a vehicle in its normal use configuration on the vehicle.

13. The connecting structure of claim 11 wherein the at least one deformation portion fold has a V-shaped cross-section.

14. A vehicle bumper assembly structured for connection to a portion of a vehicle, the bumper assembly comprising:
   a vehicle bumper reinforcement; and
   a connecting structure including a first portion connected to the bumper reinforcement and structured for connection to the portion of the vehicle,
   the connecting structure also including a second portion coupled to the first portion, the second portion being connected to the bumper reinforcement and structured for connection to the portion of the vehicle, at least one fold being positioned along a rear edge of the second portion between a connection to the bumper reinforcement and a portion of the second portion structured for connection to the portion of the vehicle, wherein the at least one fold is structured and positioned so as to at least partially unfold responsive to application of a collision force to the bumper reinforcement.

15. The vehicle bumper assembly of claim 14 further wherein the connecting structure includes at least one deformation portion positioned along a front edge of the first portion.

16. The vehicle bumper assembly of claim 15 wherein the at least one deformation portion comprises at least one fold positioned along the front edge of the first portion, the at least one fold being structured to extend upwardly when the connecting structure is mounted to a vehicle in its normal use configuration on the vehicle.

17. The vehicle bumper assembly of claim 16 wherein the at least one deformation portion fold is structured to extend a first distance above a portion of the first portion along which the at least one deformation portion fold is positioned, prior to application of the collision force to the bumper reinforcement, and wherein the at least one deformation portion fold is structured to extend a second distance above the portion of the first portion along which the at least one deformation portion fold is positioned after application of the collision force to the bumper reinforcement, wherein the second distance is greater than the first distance.

18. The vehicle bumper assembly of claim 17 further comprising a cover extending over the at least one deformation portion fold and above an upper surface of the connecting structure first portion, and wherein the at least one deformation portion fold is structured to exert a force on the cover responsive to application of the collision force to the bumper reinforcement, so as to form a raised area along the cover.

19. A method of providing a visual indication of vehicle bumper damage, the method comprising steps of:
   providing a connecting structure structured to connect a vehicle bumper reinforcement to another portion of a vehicle, the connecting structure including a deformation portion structured to deform responsive to operation of a collision force on the bumper reinforcement; and
   covering the connecting structure and the bumper reinforcement with a cover structured to be visible to a user when the cover, connecting structure, and bumper reinforcement are installed in a normal use position on a vehicle, the cover having a portion positioned adjacent the deformation portion and structured to deform responsive to deformation of the deformation portion so as to provide a visual indication of operation of the collision force on the bumper reinforcement.

* * * * *